US009336239B1

(12) United States Patent
Hoffmann et al.

(10) Patent No.: US 9,336,239 B1
(45) Date of Patent: *May 10, 2016

(54) SYSTEM AND METHOD FOR DEEP PACKET INSPECTION AND INTRUSION DETECTION

(71) Applicant: HRL Laboratories, LLC, Malibu, CA (US)

(72) Inventors: Heiko Hoffmann, Simi Valley, CA (US); Michael J. Daily, Thousand Oaks, CA (US); Gavin D. Holland, Oak Park, CA (US); Karim El Defrawy, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/742,675

(22) Filed: Jan. 16, 2013

Related U.S. Application Data

(63) Continuation-in-part of application No. 13/358,095, filed on Jan. 25, 2012, now Pat. No. 8,818,923.

(60) Provisional application No. 61/501,636, filed on Jun. 27, 2011, provisional application No. 61/589,666, filed on Jan. 23, 2012.

(51) Int. Cl.
*G06F 17/30* (2006.01)
*G06N 3/08* (2006.01)
*G06K 9/62* (2006.01)

(52) U.S. Cl.
CPC ............ *G06F 17/30247* (2013.01); *G06K 9/62* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 4,328,561 A | * | 5/1982 | Convis et al. | 715/257 |
| 5,276,316 A | * | 1/1994 | Blanford | 235/462.12 |
| 5,727,081 A | * | 3/1998 | Burges et al. | 382/229 |
| 6,041,141 A | * | 3/2000 | Yamamoto et al. | 382/231 |
| 7,085,418 B2 | | 8/2006 | Kaneko et al. | |
| 7,599,894 B2 | | 10/2009 | Owechko et al. | |
| 7,787,474 B2 | | 8/2010 | Van Lunteren | |
| 8,068,431 B2 | | 11/2011 | Varadarajan et al. | |
| 2008/0046488 A1 | * | 2/2008 | Woodley | 707/206 |
| 2009/0297043 A1 | * | 12/2009 | Hinton et al. | 382/219 |

(Continued)

OTHER PUBLICATIONS

Cavaco, "Artificial Grammar Recognition Using Spiking Neural Networks", Apr. 8, 2009.*

(Continued)

*Primary Examiner* — Jeffrey A Gaffin
*Assistant Examiner* — Ilya Traktovenko
(74) *Attorney, Agent, or Firm* — Tope-McKay & Associates

(57) ABSTRACT

The present invention relates to a system for deep packet inspection and intrusion detection. The system uses a pattern matching module receiving as an input a data stream in a neural network. Neurons are activated such that when active, the neuron fires to all connecting output neurons to form a neuron spike, each neuron spike from the assigned neuron to a connecting output neuron having a delay. A delay is associated with each input character in the pattern, such that a position of each input character relative to an end of the pattern is stored in an alphabet-pattern-delay matrix (AP-DFM). An activation matrix (AM) is used to match each input character with a stored pattern to generate a similarity match and determine if the string of characters is the stored pattern.

31 Claims, 10 Drawing Sheets

(56) References Cited

U.S. PATENT DOCUMENTS

| | | | | |
|---|---|---|---|---|
| 2010/0166298 A1* | 7/2010 | Paquier | | 382/158 |
| 2010/0166315 A1* | 7/2010 | Paquier | | 382/190 |
| 2010/0166320 A1* | 7/2010 | Paquier | | 382/209 |

OTHER PUBLICATIONS

Baron et al, "5PM: Secure Pattern Matching", 2011 HRL Laboratories, LLC.*

Gupta et al, "Character Recognition using Spiking Neural Networks", Presented at IEEE Neural Networks Conference, Orlando, FL, Aug. 2007.*

Panchev et al, "Temporal sequence detection with spiking neurons: towards recognizing robot language instructions.", Connection Science, Mar. 2006.*

Rice et al, "FPGA Implementation of Izhikevich Spiking Neural Networks for Character Recognition", 2009 International Conference on Reconfigurable Computing and FPGAs.*

Shibli et al, "MagicNET: Security Architecture for Creation, Classification, and Validation of Trusted Mobile Agents", Feb. 15-18, 2009 ICACT 2009.*

Shibli et al, "Security Infrastructure and Applications for Mobile Agents", Doctoral Dissertation in Computer and System Sciences Stockholm, Sweden 2010.*

Erik Hjelmvik & Wolfgang John, "Statistical Protocol IDentification with SPID: Preliminary Results", SNCNW'09: 6th Swedish National Computer Networking Workshop, Uppsala, Sweden. May 4, 2009 <http://spid.sourceforge.net/sncnw09-hjelmvik_john-CR.pdf>.

Martin Roesch: Snort: Lightweight Intrusion Detection for Networks. LISA 1999 <http://dblp.dagstuhl.de/db/conf/lisa/lisa1999.html#Roesch99>: 229-238.

"Technical Details of 17-filter" 2006. website http://17-filter.sourceforge.net/technicaldetails.

Khalife, J., Hajjar, A., & Diaz-Verdejo, J. (Nov. 2011). On the Performance of OpenDPI in Identifying P2P Truncated Flows. In AP2PS 2011, The Third International Conference on Advances in P2P Systems (pp. 79-84).

N. Cascarano, A. Este, F, Gringoli, F. Risso, and L. Saigarelli, "An Experimental Evaluation of the Computational Cost of a DPI Traffic Classifier", Proc. GLOBECOM'09, 2009, pp. 1-8. is related prior art.

Sipser, Introduction to the Theory of Computation. PWS. Boston. ISBN 0-534-94726-X. Section 1.1: Finite Automata, pp. 31-47, 1997.

A V Aho, M J Corasick, Efficient string matching: An aid to bibliographic search. Communications of the ACM, 18(6): 333-340, 1975.

eBayes TCP (Adaptive, Model-based Monitoring for Cyber Attack Detection. Keith Skinner & Alfonso Valdes. Lecture Notes in Computer Science. No. 1907. From Recent Advances in Intrusion Detection (RAID 2000). Edited by H. Debar and L. Me and F. Wu. Springer-Verlag, Toulouse, France, Oct. 2000. pp. 80-92.]

K. Koscher, A. Czeskis, F. Roesner, S. Patel. T. Kohno, S. Checkoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010.

Michael Sipser, Introduction to the Theory of Computation. PWS, Boston, 1997, ISBN 0-534-94726-X. Section 1.1: Finite Automata, pp. 31-47.

T Kaneko, O. Hori. Template matching method and image processing device. U.S. Pat. No. 7,085,418, 2006.

R.S. Boyer, et al., "A fast string searching algorithm," Communications of the ACM, 20; 762-772, 1977.

M. Zubair, et al., "Text scanning approach for extract string matching," International Conference on Networking and Information Technology, 2010.

M. Sipser, "Introduction to the Theory of Computation," PWS, Boston, ISBN 0-534-94728-X, Section 1.1; Finite Automata, pp. 31-47, 1997.

W. Maass, et al., "Real-time computing without stable states; a new framework for neural computation based on perturbations," Neural Computation 14(11); 2531-2560, 2002.

A.V. Aho, et al., "Efficient string matching: An aid to bibliographic search," Communication of the ACM, 18(6): 333-340, 1975.

A. Waibel, et al., "Phoneme Recognition Using Time-Delay Neural Networks," IEEE Transactions on Acoustics, Speech, and Signal Porcessing. 37(3): 328-339, 1989.

J.L. Elman, "Finding structure in time." Cognitive Science, 14(2): 179-211, 1990.

E.M. Izhikevich, "Polychroniation: Computation with spikes," Neural Computation, 18(2): 245-282, 2006.

H. Pugam-Moisy, et al., "Delay learning and polychronization for reservoir computing," Neurocomputing, 71 (7-9): 1143-1158, 2008.

W. Maier, et al., "A Minimal Model for the Study of Polychronous Groups," arXiv:0806.1070v1 [Condensed Matter. Disordered Systems and Neural Networks], 2008.

L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain.

L. G. Brown, "A survey of image registration techniques," ACM Comput. Surv., vol. 24, No. 4, pp. 325-376, 1992.

J. J. Hopfield, Neural networks and physical with emergent collective computational abilities, Proceedings of the National Academy of Sciences of the USA, vol. 79 No. 8 pp. 2554-2558, Apr. 1982.

P Wang, A DeNunzio, P Okunieff. WG O'Dell. Lung metastases detection in CT images using 3D template matching. Med. Phys. 34 (3), pp. 915, Mar. 2007.

Luigi di Stefano, Stefano Mattoccia, Federico Tombari, "An Algorithm for Efficient and Exhaustive Template Matching," Jan. 2004: In proceedings of Image Analysis and Recognition: International Conference, ICIAR 2004, Porto, Portugal, Sep. 29-Oct. 1, 2004. Proceedings, Part II.

Alfred V. Aho and Margaret J. Corasick. Efficient string matching: an aid to bibliographic search. Commun. ACM, 18:333-340, Jun. 1975.

Marina Blanton and Mehrdad Ahasgari. Secure outsourcing of dna searching via finite automata. In 24th annual IFIP WG 11.3 working conference on Data and applications security and privacy (DBSec'10). pp. 49-64, 2010.

Taher El Gamal. A public key cryptosystem and a signature scheme based on discrete logarithms. In Proceedings of CRYPTO 84 on Advances in cryptology, pp. 10-18, New York, NY, USA, 1985. Springer-Verlag New York, Inc.

Ronald Cramer, Rosario Gennaro, and Berry Schoenmakers. A secure and optimally efficient multi-authority election scheme. pp. 103-118. Springer-Verlag, 1997.

Ivan Dåmgard. Efficient concurrent zero-knowledge in the auxillary string model. In Proceedings of the 19th International conference on Theory and application of cryptographic techniques, EUROCRYPT'00, pp. 418-430, Berlin, Heidelberg. 2000. Springer-Verlag.

Ivan Dåmgard and Mats Jurik. A generalisation, a simplification and some applications of pailler's probabalistic public-key system, In Proceedings of the 4th International Workshop on Practice and Theory in Public Key Cryptography: Public Key Cryptography, PKC '01, pp. 119-136, London, UK, 2001. Springer-Verlag.

Ivan Dåmgard and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.

Jens Groth and Yuval Ishari. Sub-linear zero-knowledge argument for correctness of a shuffle, In Nigel Smart, editor, Advances in Cryptology—EUROCRYPT 2008, vol. 4965 of Lecture Notes in Computer Science, pp. 379-396. Springer Berlin / Heidelberg, 2008.

O. Goldreich, S. Micali, and A. Wigderson. How to play any mental game. In Proceedings of the nineteenth annual ACM symposium on Theory of computing, STOC '87, pp. 218-229, New York, NY, USA, 1967, ACM.

Juan A. Garay, Philip MacKenzie, and Ke Yang. Strengthening zero-knowledge protocols using signatures. In Proceedings of the 22nd international conference on Theory and applications of crypto-

(56) References Cited

OTHER PUBLICATIONS graphic techniques, EUROCRYPT'03, pp. 177-194, Berlin, Heidelberg. 2003, Springer-Verlag.
Carmit Hazay, Rosario Gennaro, and Jeffery Sorensen. Automata evaluation and text search protocols with simulation based security. In Public Key Cryptography, pp. 145-160, 2010.
Heiko Hoffmann, Michael Howard, and Michael Daily. Fast pattern matching with time-delayed neural networks. In International Joint Conference on Neural Networks (to appear), 2011.
Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2008. Springer-Verlag.
Carmit Hazay and Tomas Toft. Computationally secure pattern matching in the presence of malicious adversaries. In ASIACRYPT, pp. 195-212. 2010.
Yuval Ishari, Manoj Prabhakaran, and Amit Sahai. Founding cryptography on oblivious transfer—efficiently. In Proceedings of the 28th Annual conference on Cryptology: Advances in Cryptology. CRYPTO 2008, pp. 572-591, Berlin, Heidelberg. 2008. Springer-Verlag.
Jonathan Katz and Lior Malka. Secure text processing with applications to private dna matching. In Proceedings of the 17th ACM conference on Computer and communications security, CCS '10, pp. 485-492, New York, NY, USA. 2010. ACM.
Knuth, Donald; Morris, James H., jr; Pratt, Vaughan (1977). "Fast pattern matching in strings". SIAM Journal on Computing 6(2): 323-350.
Richard M. Karp and Michael O. Rabin. Efficient randomized pattern-matching algorithms. IBM J. Res. Dev., 31:249-260, Mar. 1967.
K. Namjoshi and G. Marlikar. Robust and fast pattern matching for intrusion detection. In INFOCOM, 2010 Proceedings IEEE, pp. 1-9, Mar. 2010.
Pascal Paillier. Public-key cryptosystems based on composite degree residuosity classes. In Proceedings of the 17th international conference on Theory and application of cryptographic techniques. EUROCRYPT'99. pp. 223-238, 1999.
Torben P. Pedersen. Non-interactive and information-theoretic secure verifiable secret sharing. In Proceedings of the 11th Annual International Cryptology Conference on Advances in Cryptology, CRYPTO '91, pp. 129-140, London, UK, 1992. Springer-Verlag.
Structural joins: A primative for efficient xml query pattern matching. In Proceedings of the 18th International Conference on Data Engineering, ICDE '02, pp. 141-, Washington, DC, USA, 2002, IEEE Computer Society.
Claus-Peter Schnorr. Efficient identification and signatures for smart cards. In Proceedings of the 9th Annual International Cryptology Conference on Advances in Cryptology, CRYPTO '89, pp. 239-252, London, UK, UK, 1990. Springer-Verlag.
Juan Ramón Troncoso-Pastoriza, Stefan Katzenbeisser, and Mehmet Celik. Privacy preserving error resilient dna searching through oblivious automata. In Proceedings of the 14th ACM conference on Computer and communications security, CCS'07, pp. 519-528, New York, NY, USA, 2007. ACM.
Tsung-Hsi Tsai. Average case analysis of the boyer-moore algorithm. Random Struct. Algorithms, 28:481-498, Jul. 2006.
Andrew C. Yao. Protocols for secure computations. In Proceedings of the 23rd Annual Symposium on Foundations of Computer Science, SFCS '82, pp. 160-164, Washington, DC, USA, 1982. IEEE Computer Society.
Andrew Chi-Chih Yao. How to generate and exchange secrets. In Proceedings of the 27th Annual Symposium on Foundations of Computer Science, pp. 162-167, Washington, DC, USA, 1986. IEEE Computer Society.
Joshua Baron, Karim El Defrawy, Kirill Minkovich, Rafail Ostrovsky, and Eric Tressler. 5PM: Secure Pattern Matching. Security and Cryptography for Networks. Lecture Notes in Computer Science. vol. 7485, pp. 222-240, 2012.

\* cited by examiner

Output Neuron Levels (per Unit Time (t))

| Patterns | $a_{t=1}$ | $a_{t=2}$ | $a_{t=3}$ | $a_{t=4}$ | ... | $a_{t=n}$ | | |
|---|---|---|---|---|---|---|---|---|
| $p_i$ | | | | | | | | |
| ... | | | | | | | | |
| $p_k$ | | | | | | | | |

FIG. 5

SYSTEM AND METHOD FOR DEEP PACKET INSPECTION AND INTRUSION DETECTION

CROSS-REFERENCE TO RELATED APPLICATIONS

This is a Continuation-in-Part application of U.S. Non-Provisional Application No. 13/358,095, filed on Jan. 25, 2012, and entitled, "Neural Network Device with Engineered Delays for Pattern Storage and Matching," which is a non-provisional application of U.S. Provisional Application No. 61/501,636, filed on Jun. 27, 2011 and entitled, "Neural Network Device with Engineered Delays for Pattern Storage and Matching."

This is ALSO non-provisional patent application of U.S. Provisional Application No. 61/589,666. filed on Jan. 23, 2012, entitled, "System and Method for Deep Packet Inspection and Intrusion Detection."

BACKGROUND OF THE INVENTION (1) Field of Invention

The present invention relates to an intrusion detection system and, more particularly, to an intrusion detection system that is operable for performing Deep Packet Inspection (DPI) at wire speeds in software running on conventional processors.

(2) Description of Related Art

Cyber security has become an increasingly important aspect of system business security. Any information generating and accepting device (vehicles, computer systems, etc.) that utilizes many diverse networks may be targeted by malicious attacks aiming to impact both critical and non-critical systems. The backup approach of "security by obscurity" is insufficient. In addition, current trends indicate greater exposure to potential attacks. Current vehicular standards do not include defense-in-depth strategies that require detection as a core building block. V2X networks will be used as an extension of cellular networks to provide high bandwidth to the car, which further exposes vehicle systems to attacks. The use of common third party operating systems makes vehicles vulnerable to a much larger volume of existing attacks and signatures. While the traffic volume inside, into, and out of the vehicle is lower than that on Internet routers in the backbone, the large size of the attack signature database and the need for low size, weight, and power solutions make traditional methods and hardware unacceptable for use in the vehicle.

Within the realm of cyber security, current software solutions for intrusion detection use pattern matching methods, such as Deterministic Finite Automata (DFA) with attack signatures. However, due to the high volume of traffic in Internet data streams, such systems can only operate at approximately 500 Mbps. In addition, traditional methods cannot add new attack signatures to their search in real-time without significant overhead due to rebuilding the DFA; nor can they perform partial matches against attack signatures.

Finite state machines are most widely used in systems that attempt to perform Deep Packet Inspection. For clarity, Deep Packet Inspection (DPI) is a form of computer network packet filtering that examines the data part of a packet as it passes an inspection point, searching for protocol non-compliance, such as intrusions. Finite state machines are used for DPI due to their ability to handle wildcards in the attack signature matching string (wildcards are places in the matching string that do not require a specific character from the alphabet). The widely-used open source software solution for intrusion detection is called Snort, as provided by Sourcefire, Inc., located at 9770 Patuxent Woods Drive, Columbia, Md. 21046, United States.

Snort uses a particular type of a finite state machine (i.e., DFA) that computes only one state transition per input character, thus its computational complexity is $O(1)$; therefore, theoretically, the speed is independent of pattern length and alphabet size. Snort (DFA) has several disadvantages, such as:

a. It is slow for detecting attach signatures in software for large alphabets and relatively small pattern lengths;

b. Snort DFA requires additional cost for building a state-transition table (for each stored pattern that is to be matched against an input stream, a state-transition table has to be computed). As the alphabet size grows and new attack signatures must be added, it cannot be used in real-time.

c. Snort DFA cannot be parallelized easily, limiting its scalability to high traffic volumes.

d. Snort DFA cannot be used to detect partial patterns and higher order patterns (with long sequences of wildcards).

Thus, a continuing need exists for a DPI inspection system that enables the detection of attack signatures in software at speeds that are considerably faster than DFA. Further, a continuing need exists for such a system that can efficiently search inside the payload of each packet, while being updated for new attack signatures in real-time and that can also be used to detect partial attack signatures.

SUMMARY OF INVENTION

The present invention relates to a system for deep packet inspection and intrusion detection. The system includes one or more processors and a memory. The memory includes instructions encoded thereon such that upon execution of the instructions, the one or more processors cause a pattern matching module to perform several operations as described herein. For example, the system receives as an input a data stream in a neural network. The data stream has a sequence of characters in a pattern and is received in the neural network such that at each time t, only a single input character is received. Each single input character assigned to a neuron in the neural network. The neuron assigned to the single character is activated such that when active, the neuron fires to all connecting output neurons to form a neuron spike, with each neuron spike from the assigned neuron to a connecting output neuron having a delay. A delay associated with each input character in the pattern is determined, such that a position of each input character relative to an end of the pattern is stored in an alphabet-pattern-delay matrix (APDFM). Finally, using an activation matrix (AM), each input character is matched with a stored pattern to generate a similarity match, such that if the similarity match exceeds a predetermined threshold, the sequence of characters in the input data stream is identified as the stored pattern.

In another embodiment, the activation matrix is a matrix formed of columns and rows, with each column corresponding to a time step (t) and a single input character, with the rows corresponding to stored patterns against which the input characters are matched.

Further, when a current input character is matched in the activation matrix, the system determines if the current input character is present in the APDM and performs one of the following operations:

a. if the current input character is not present in the APDM, then a current column of the AM is cleared as the input character (x) is not present in any of the patterns;
b. if the current input character is present in the APDM, then:
  i. retrieving a list of patterns from the APDM that contain one or more occurrences of the current input character and the corresponding delays for the current input character within each pattern;
  ii. For each pattern ($p_i$) in the list, adding a one to cell number ((t+$d_j$)mod n) in the AM, where ($d_j$) is the $j^{th}$ delay associated with current input character in ($p_i$);
  iii. determining if any of the cells in column (t) of the AM have exceeded a predetermined threshold for the stored pattern associated with each row;
    1. if so, then designating the stored pattern corresponding to that row as a match; and
c. clearing the current column of the AM, and repeating operations (a) through (b) for a next input character.

In another embodiment, in matching with an activation matrix, wraparound occurs through periodic operation of the activation matrix, with a weight (w) being assigned to each output neuron when matching input characters, the weight (w) being a number of times a wraparound occurs.

Additionally, a frequency at which the operation of clearing the current column of the AM is reduced by providing increasingly higher weights (w) and corresponding thresholds when determining if any of the cells in column (t) of the AM have exceeded a predetermined threshold for the stored pattern associated with each row.

In another embodiment, in matching with an activation matrix, the system performs partial matching by performing operations of assuming that a pattern to be matched is of length (n); and adjusting a firing threshold to value (p), less than (n), for an output neuron, thereby causing the output neuron to fire when any (p/n) of the input characters of the pattern are matched.

In yet another embodiment, in matching with an activation matrix, the system operates two activation matrices, a first activation matrix for pattern matching and a second activation matrix for clearing in parallel future uses.

In another embodiment, the system further includes a pre-processing module. The pre-processing module receives and decodes an input packet stream to generate a stream of input characters in a pattern, wherein the pattern matching module thereafter determines if the pattern in the stream of input characters is matched with any stored patterns. The system also includes an analysis module for logging and filtering the input packet stream if it is determined that the pattern in the stream of input characters is a match with a stored pattern.

In yet another embodiment, the pre-processing module receives and decodes an input packet stream to generate a stream of input characters. In this aspect, a stream splitting module is included. The stream splitting module splits the stream of input characters into parallel streams of characters. Further, a plurality of pattern matching modules is included. Each pattern matching module receives only a portion of the stream of characters and all known stored patterns to determine if a pattern in the portion of the stream of input characters is matched with any stored pattern.

In yet another embodiment, the pre-processing module receives and decodes an input packet stream to generate a stream of input characters in a pattern. In this aspect, a stream splitting module is included. The stream splitting module splits the stream of input characters into multiple complete streams of characters. Further, a plurality of parallel pattern matching modules is included. Each pattern matching module receives a complete stream of characters and only a portion stored patterns to determine if a pattern in the stream of input characters is matched with any stored pattern in the portion of stored patterns.

In yet another embodiment, the pre-processing module receives and decodes an input packet stream to generate a stream of input characters in a pattern. In this aspect, the pattern matching module thereafter determines if the pattern in the stream of input characters is matched with any stored patterns. An analysis module is included for logging and filtering the input packet stream if it is determined that the pattern in the stream of input characters is a match with a stored pattern. Additionally, the system includes an inference engine for detecting, in real-time, new anomalous patterns and storing the new anomalous pattern with the stored patterns.

Finally, the present invention also includes a method and computer program product. The computer program product includes instructions encoded on a non-transitory memory for causing a processor to perform the operations listed herein, while the method comprises an act of causing a processor to execute instructions on a memory to perform the listed operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is an illustration depicting an Activation Matrix (AM);

DETAILED DESCRIPTION

Figure 1:
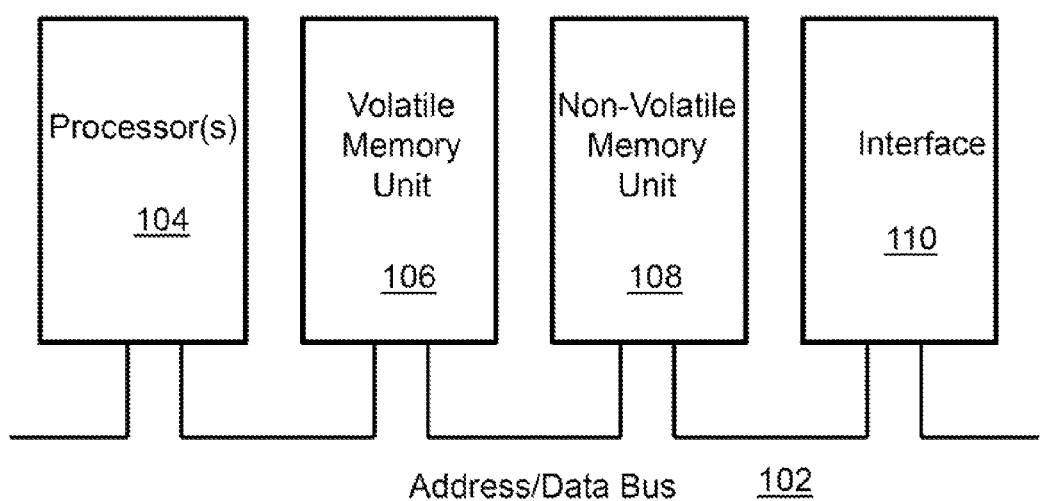
FIG. 1 is a block diagram depicting the components of a system of the present invention.

The present invention relates to an intrusion detection system and, more particularly, to an intrusion detection system that is operable for performing Deep Packet Inspection (DPI) at wire speeds in software running on conventional processors. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, an introduction provides the reader with a general understanding of the present invention. Finally, specific details of the present invention are provided to give an understanding of the details and specific embodiments according to the principles of the present invention.

(1) Principal Aspects

The present invention has three "principal" aspects. The first is a system for deep packet inspection and intruder detection. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an embodiment, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an embodiment, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the computer system 100 may include an input device 112 coupled with the address/data bus 102, wherein the input device 112 is configured to communicate information and command selections to the processor 100. In accordance with one embodiment, the input device 112 is an alphanumeric input device, such as a keyboard, that may include alphanumeric and/or function keys. Alternatively, the input device 112 may be an input device other than an alphanumeric input device. In an embodiment, the computer system 100 may include a cursor control device 114 coupled with the address/data bus 102, wherein the cursor control device 114 is configured to communicate user input information and/or command selections to the processor 100. In an embodiment, the cursor control device 114 is implemented using a device such as a mouse, a track-ball, a track-pad, an optical tracking device, or a touch screen. The foregoing notwithstanding, in an embodiment, the cursor control device 114 is directed and/or activated via input from the input device 112, such as in response to the use of special keys and key sequence commands associated with the input device 112. In an alternative embodiment, the cursor control device 114 is configured to be directed or guided by voice commands.

In an embodiment, the computer system 100 further may include one or more optional computer usable data storage devices, such as a storage device 116, coupled with the address/data bus 102. The storage device 116 is configured to store information and/or computer executable instructions. In one embodiment, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one embodiment, a display device 118 is coupled with the address/data bus 102, wherein the display device 118 is configured to display video and/or graphics. In an embodiment, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is on example computing environment in accordance with an embodiment. However, the non-limiting example of the computer system 100 is not strictly limited to being a computer system. For example, an embodiment provides that the computer system 100 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more embodiments of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
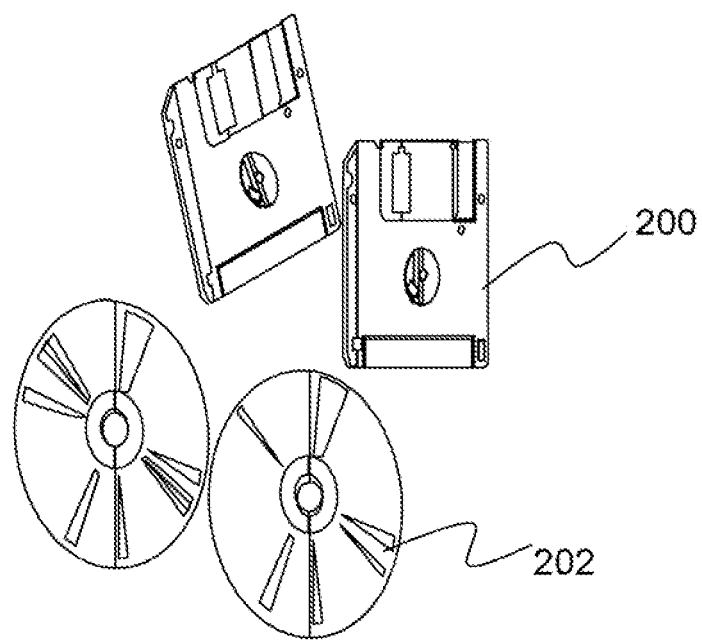
FIG. 2 is an illustration of a computer program product embodying the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics computer operations coded into as computer chip). The "instruction" may be stored in the memory of a computer or on a computer-readable medium such as a floppy disk, a CD-ROM, and a flash drive. In either event, the instructions are encoded on a non-transitory computer-readable medium.

(2) Introduction

As noted above, the present invention is directed to an intrusion detection system that is operable for performing Deep Packet Inspection (DPI) at wire speeds in software running on conventional processors. The system uses an underlying detection engine (MagicNet) that is based on the relatively new theory of polychronous spiking neural models. The system uses a new and different paradigm than other recent spiking models and liquid state machines in that the network conduction delays are set to optimize detection of specific known patterns of interest (exact pattern matching). By setting the network conduction delays, the system is adapted to provide a more efficient detection than previous methods. In special purpose parallel hardware or a neuromorphic implementation, the system and method is operable for detecting attack signatures at wire speeds greater than 1 Tbps, and with much lower size, weight, and power than conventional methods.

Since fast detection forms the foundation for a variety of cybersecurity applications, this invention can be implemented in a variety of domains. Without implying a limitation, these domains include: Deep packet inspection at Internet wire speeds is useful for detecting buffer overflow attacks, one packet Denial-of-Service (DoS) attacks, and sophisticated intrusions, viruses, and worms, among others. Detection is the first line of defense against insider threats, and is critical for secure, resilient systems and networks where survivability of time-critical systems is at risk. Modeling of Internet attacks requires detection of malware as it propagates on networks as well as detection of malware infections on specific systems. Network Mapping and Measurement requires monitoring and measurement applied to detection and mitigation of attacks on routing infrastructure and DNS behavior.

Additional applications include future vehicles (manned and unmanned), factory systems, and any other information generating and accepting device that utilizes many diverse networks; all of which may be targeted by malicious attacks aiming to impact both critical and non-critical systems.

(4) Specific Details of the Invention

Figure 3A:
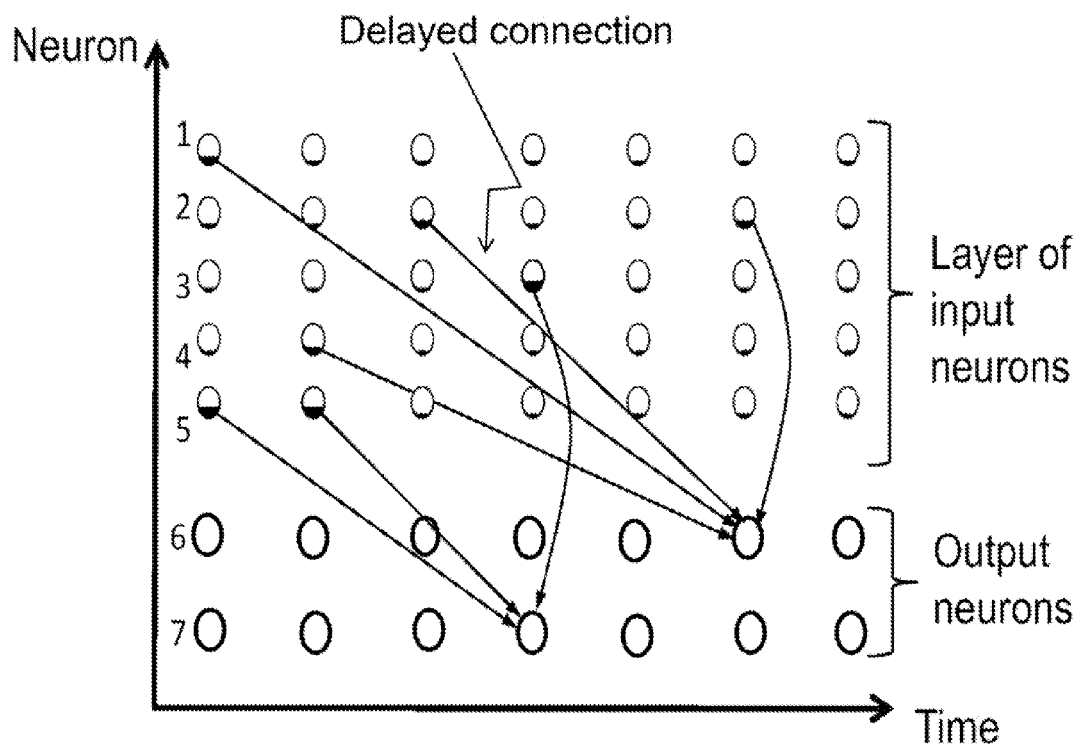
FIG. 3A is an illustration providing a brief summary of a MagicNet concept.

As noted above, the system optimizes use of an underlying detection system (i.e., MagicNet) and implements such a system in Deep Packet Inspection (DPI) and intrusion detection. Specific details regarding MagicNet can be found in U.S. Non-Provisional Application No. 13/358,095, which is incorporated by reference as though fully set forth herein. FIG. 3A provides an illustration summarizing the concept of MagicNet. As shown in FIG. 3A, MagicNet is a neural network device with engineered connection delays for pattern storage and matching. In the example depicted, patterns "1 4 2 ? 2" and "5 5 ? 3" are stored as the input neurons for the corresponding output neurons, where "48" is a one-character wildcard.

Figure 3B:
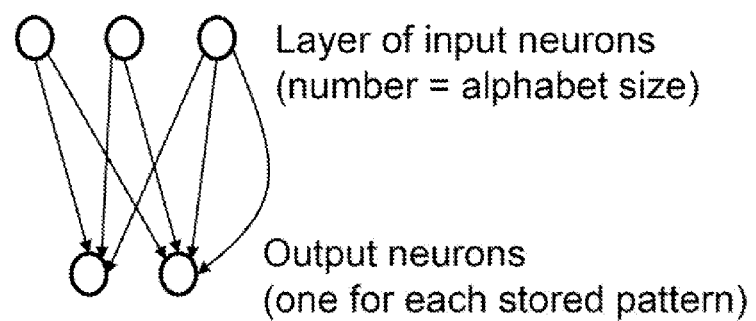
FIG. 3B is an illustration of a two-layer neural network that conceptually realizes a MagicNet.

FIG. 3B depicts a realization of a MagicNet in a neural network of two layers: an input layer and an output layer. The connections between input and output neurons have variable delays, and, as in this example, multiple connections are allowed between two neurons. For each element in the alphabet of an input stream, the network has one input neuron. To store a new pattern, a new output neuron is added and connections to this neuron are created and their delays set depending on the sequence of characters within the pattern.

MagicNet requires three main steps as detailed below.

(4.1) MagicNet-Step One

Figure 4:
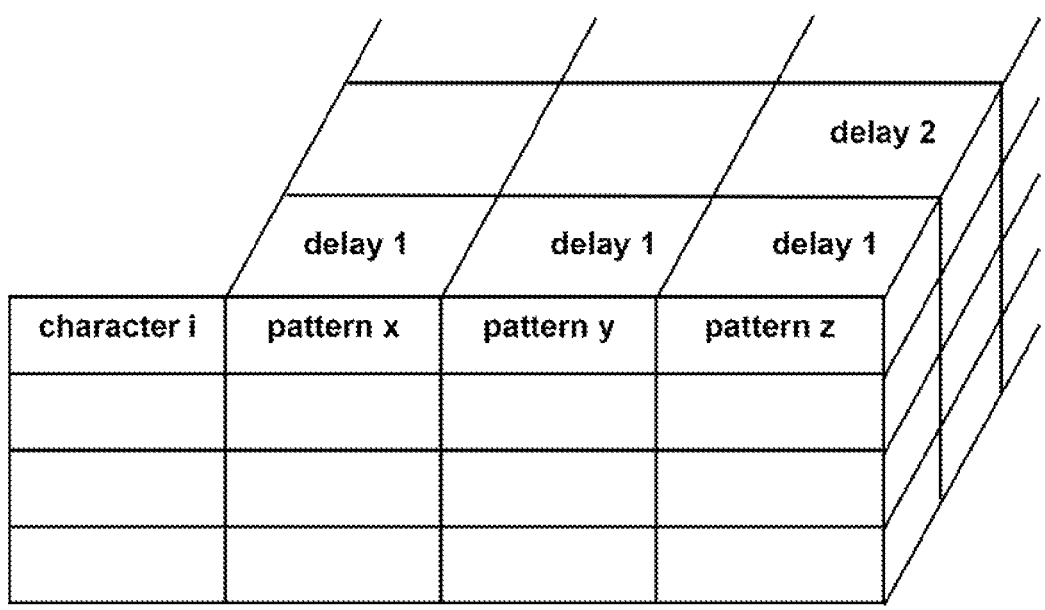
FIG. 4 is an illustration depicting an Alphabet-Pattern-Delay Matrix (APDM)

In step one, patterns are pre-processed. For example, a delay (the position of each character relative to the end of the pattern) is associated with each letter in every pattern. As shown in FIG. 4, this information is stored in a matrix, an example of which is an alphabet-pattern-delay matrix (APDM). APDM contains pattern letters from the alphabet at hand, i.e, only the letters that were encountered in the patterns. APDM also contains the patterns in which each letter was present and the associated delays. Note that a letter can occur several times in each pattern, so there may be more than one delay value.

(4.2) MagicNet-Step Two

In step two and as illustrated in FIG. 5, an activation matrix (AM) keeps track of which output neurons should have weights (w) added to them when matching input characters. Each column in that matrix corresponds to a time step (input character). The matrix is periodic (i.e., wraps around). The rows of the matrix correspond to the patterns being matched against. The system starts at the first column when matching the input character, then column two when matching the second, and so on.

(4.3) MagicNet-Step Three

When an input character (x) is matched there are two response options (assume the current column being considered is column number (t)):

a) Character (x) is not present in the APDM:
  i) Clear the current column of the AM, since the character is not present in any of the patterns.

b) Character (x) is present in the APDM:
  i) Retrieve the list of patterns from the APDM that contain one or more occurrences of (x), and the corresponding delays for (x) within each pattern.
  ii) For each pattern ($p_i$) in the list, add a one to cell number $((t+d_j) \bmod n)$ in the AM, where ($d_j$) is the $j^{th}$ delay associated with (x) in ($p_i$). With respect to mod n, the value of an integer modulo n is equal to the remainder left when the number is divided by n. In this case, modulo n is written as mod n.
  iii) Check if any of the cells in column (t) of the AM have exceeded the threshold for the pattern associated with each row. If so, then the pattern corresponding to that row has matched, and the subsequent pre-defined actions are taken for a match of the pattern.
  iv) Clear the current column of the AM, and repeat Step Three for the next input character.

(4.4) MagicNet Optimizations:

The present invention provides several optimizations to reduce the number of operations required when matching a character using MagicNet. During the operation of MagicNet, the AM column corresponding to the current time slot (t) has to be cleared (reset to 0) before moving to the next time slot (t+1) and considering the next character. Since the column length is the number of patterns being matched against, this incurs significant overhead when matching against a large number of patterns. Described below is one example of how this overhead can be reduced.

In one embodiment according to the principles of the present invention, the computational overhead is reduced by using two AMs, one that is actively in use for pattern matching (e.g., "AM1") and one that is being cleared in parallel for future use (e.g., "AM2"). The pattern matching operations on AM1 will be the same as in the normal case, except when wraparound occurs. A wraparound occurs when the time slot (column) being considered is beyond the end of AM1. For instance, when the corresponding delays for the current input character $((t+d_j) \bmod n)$ results in "wrapping around" and writing a result into a column near the beginning of AM1. When this occurs, instead of writing to AM1, the result is written to AM2. Once time advances to the last column of AM1, the matrices are swapped such that AM2 is active and AM1 is set to be cleared. Thus, the next time slot starts at the first column of AM2 and continues in AM2, while, in parallel, AM1 is cleared. The same operation is repeated when the end of AM2 is reached (i.e., when wraparound in AM2 occurs, AM1 is used to store the results that wrap around, and, once the last column of AM2 is reached, AM1 once again becomes the active matrix and AM2 is cleared). This process then keeps repeating. This technique will require extra memory of size: $n \cdot \text{len}(p_i)$, where n is the number of patterns to be matched and $\text{len}(p_i)$ is the length of pattern ($p_i$).

To reduce the frequency at which a column must be cleared, increasingly higher weights and corresponding thresholds can be used for the values in the AM. The higher thresholds omit false positives that would occur without clearing the AM. Every time a wraparound occurs, instead of adding a 1 and comparing against (n), add $(n+1)^w$ and compare the result against a threshold of $n \cdot (n+1)^w$, where (w) is the number of times a wraparound has occurred (w=0, initially). For example, if a pattern had a length of n=3, in the first round a 1 will be added to a time slot at the position corresponding to $((t+d_j) \bmod n)$ in the AM when a match occurs. When the last column of the AM is reached and a wraparound occurs, (w) is incremented (w=1), and instead of adding 1 now 4 will be added and the threshold being compared against will be 12 instead of 3. When the second wrap around occurs, (w=2) and instead of adding 4 now 16 will be added and the threshold being compared against will be 48 instead of 12. Columns will only be cleared once ($w_{max}$) wraparounds are performed, where: $w_{max} = \text{floor}((\log T/2)/(\log(n+1)))$. In this case, (T) is the maximum value that can be stored in one slot in the AM, (e.g., for 4 Byte integers, $T=2^{32}$). Using this technique, column clearing only has to happen every ($w_{max} \cdot n$) input characters for each row, where (n) is the length of the pattern corresponding to the row.

In the case of exact matching, the threshold (t) for the output neuron to fire is set to (n). Thus, the output neuron corresponding to that pattern will fire if-and-only-if all the characters in the pattern were matched in the same order as their positions in the pattern. The method described here enables an output neuron to fire if a subset of the characters in the pattern is matched, which is called a partial match. Partial matching is realized according to the principles of the present invention as follows:

a. Assume that the pattern to be matched is of length (n).
  b. Adjust the firing threshold to a value (p), less than (n), for the output neuron. Thus, if any (p/n) of the characters of the pattern are matched, then the output neuron will fire.

Note that only one neuron with the adjusted fixing threshold is required to catch any (p/n) of the characters of the pattern to be matched. Also, for any given pattern, multiple thresholds may be stored, corresponding to various values of (p), and multiple actions to perform for each partial match.

(4.5) Embodiments

Figure 6:
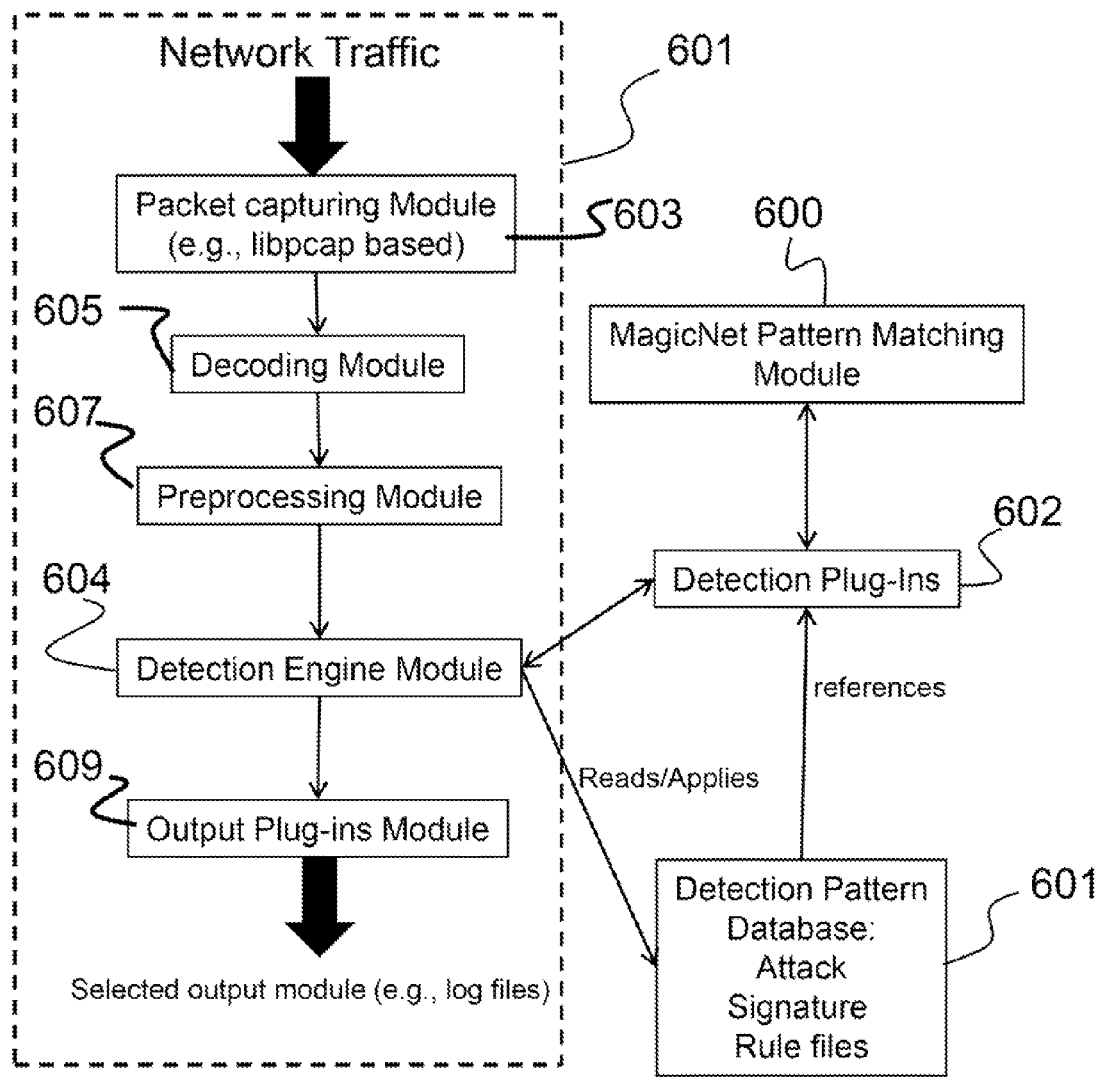
FIG. 6 is a block diagram depicting a Snort system, illustrating how MagicNet can be implemented as a pattern matching module within Snort.
Figure 9:
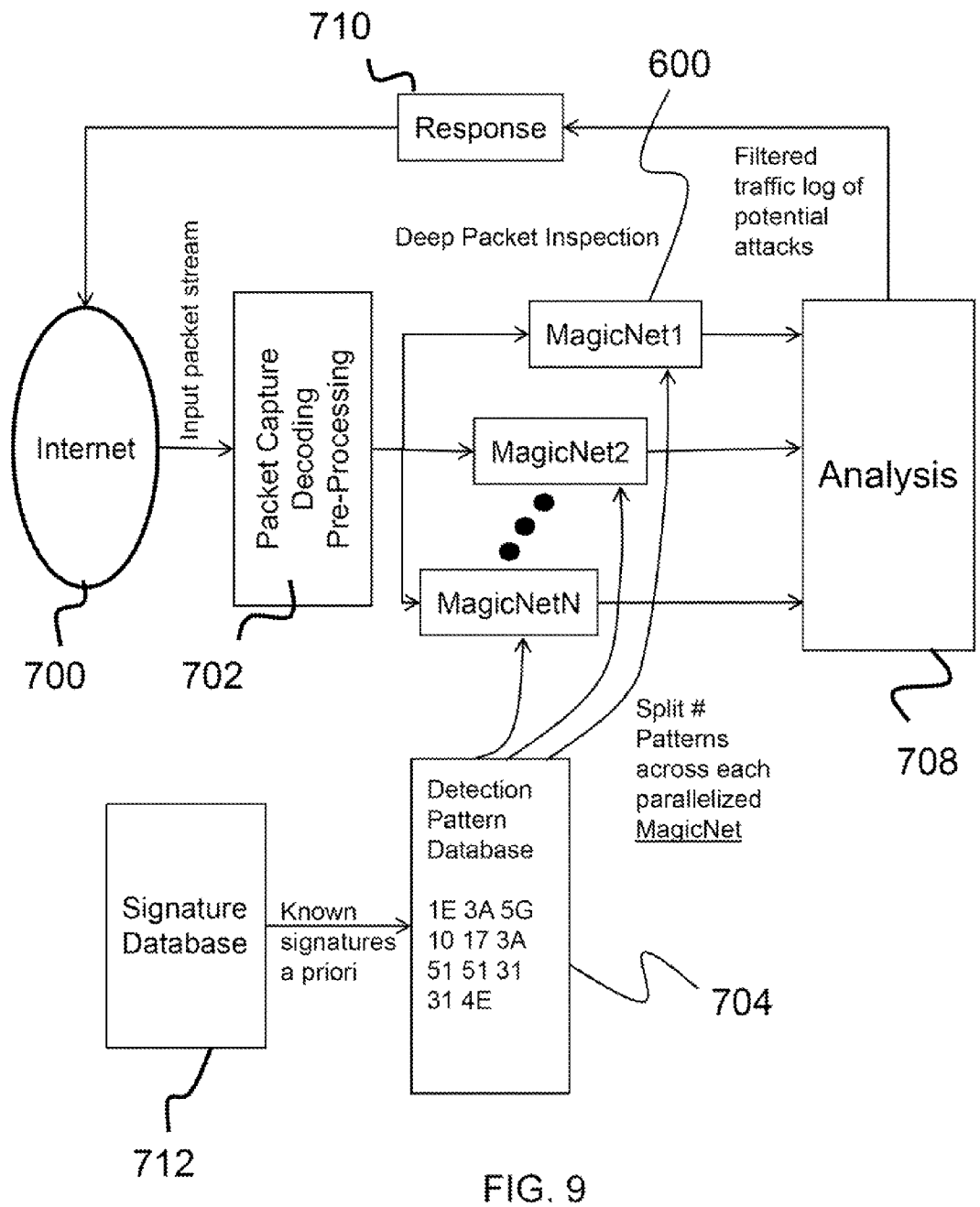
FIG. 9 is a block diagram, depicting a desired embodiment in which each MagicNet pattern matching module runs on parallel hardware (e.g., GPU), and in which the pattern database is split evenly across processors, but each GPU gets the whole MagicNet network.

As can be appreciated, the system for DPI and intrusion detection can be utilized in several applications. For example, FIG. 6 provides a typical block diagram of a Snort system, illustrating where the new detection capability (i.e., MagicNet Pattern Matching Module 600) can be added to enhance a traditional Snort system. In addition, several embodiments specific to the principles of the present invention are described in subsequent figures, including a desired aspect for deep packet inspection on the Internet (as shown in FIG. 9). Each of these embodiments can be used within the general framework of Snort as shown in FIG. 6.

In general, the invention operates in two modes: setup mode and online mode. During setup mode, static signatures from available databases of attack signatures are placed into a detection pattern database 601. Patterns are then stored into the network as described in U.S. Non-Provisional Application No. 13/358,095. In the online mode of operation, input packets are streamed through the architecture (as in FIG. 6) with the MagicNet Pattern Matching Module 600 performing rapid detection and subsequent modules providing a summary of detected signatures. Unlike prior art, the system of the present invention can provide output from the system to users or other modules in real-time (e.g., one time step after the last input character in a pattern). FIG. 6 depicts one embodiment in which the MagicNet Pattern Matching Module 600 can reside within the overall Snort infrastructure 601 as a detection plug-in 602 within or in conjunction with a detection engine module 604. For example and as shown, a packet capturing module 603 receives the network traffic to capture packets, which are then sent to a decoding module 605 and preprocessing module 607 prior to the detection plug-in 602, with the results output via an output plug-in module 609.

Figure 7:
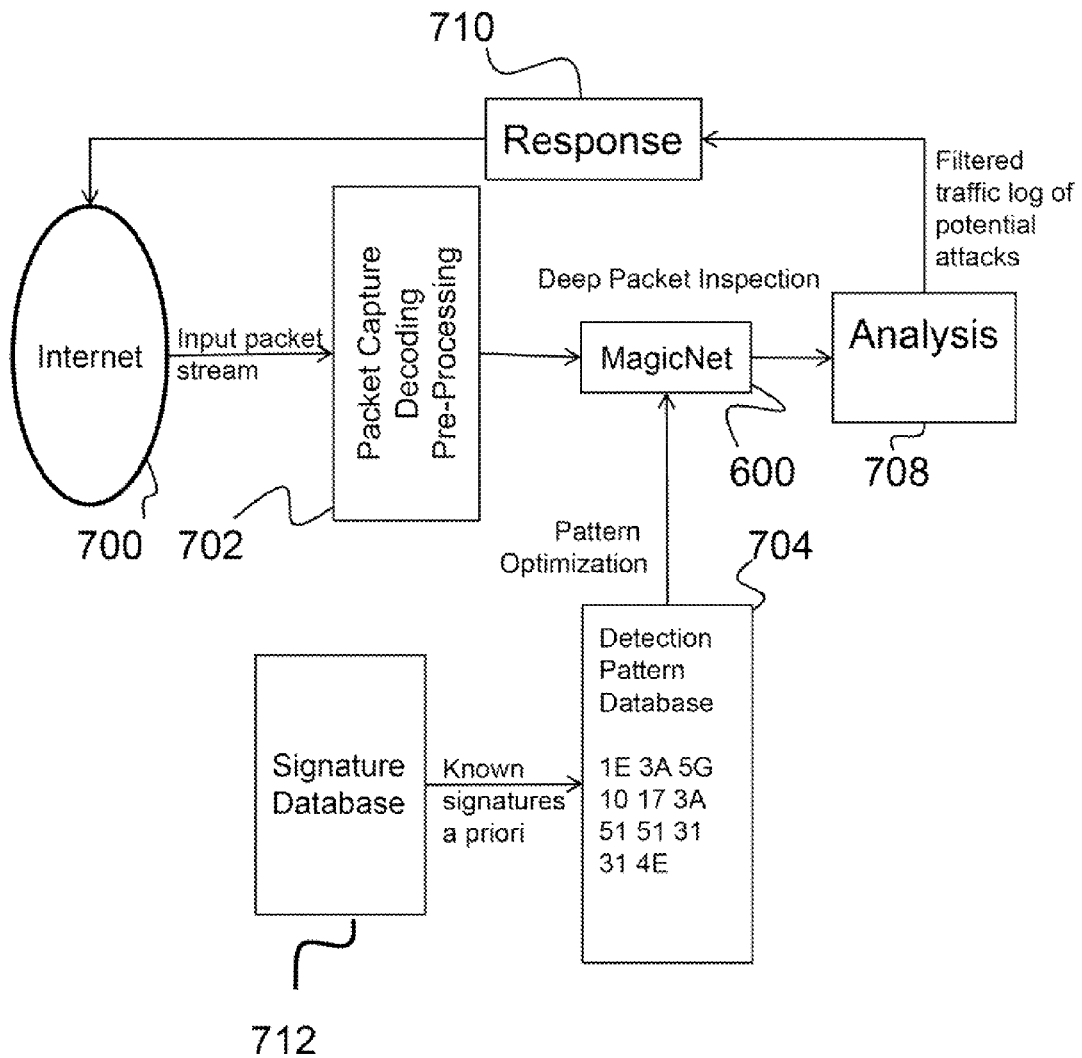
FIG. 7 is a block diagram, depicting an embodiment in which a single MagicNet pattern matching module operates on entire stream with a full pattern database.

FIG. 7 provides another embodiment according to the principles of the present invention, in which a single MagicNet Pattern Matching Module 600 is connected with a system for deep packet inspection. As shown, an input packet stream is received into the system from the internet 700. A pre-processing module 702 captures and decodes the packet to generate a string or stream of characters in a sequence or pattern. The pre-processing module 702 in this embodiment and as used throughout the several embodiments according to the present invention is any suitable module operable for capturing an input data stream and generating a string or stream of characters in a sequence or pattern. A non-limiting example of such a module is that used by the Snort system of the prior art (as provided by Sourcefire, Inc., located at 9770 Patuxent Woods Drive, Columbia, Md. 21046, United States), which is incorporated herein by reference. The output from the pre-processing module 702 is a continuous stream, whose characters are from the same alphabet as the patterns stored in the MagicNet Pattern Matching Module 600 and that are used for pattern matching.

Using an a priori detection pattern database 704 (based on, for example, a signature database 712), the MagicNet Pattern Matching Module 600 inspects the sequence of input characters as they stream through the system to identify any patterns that match potential attacks or are otherwise indicative of a problematic packet pattern. An analysis module 708 filters and provides a log of suspect packets (e.g., attacks) that can be used to provide an appropriate response 710, such as filtering such packets from the incoming packet stream.

Figure 8:
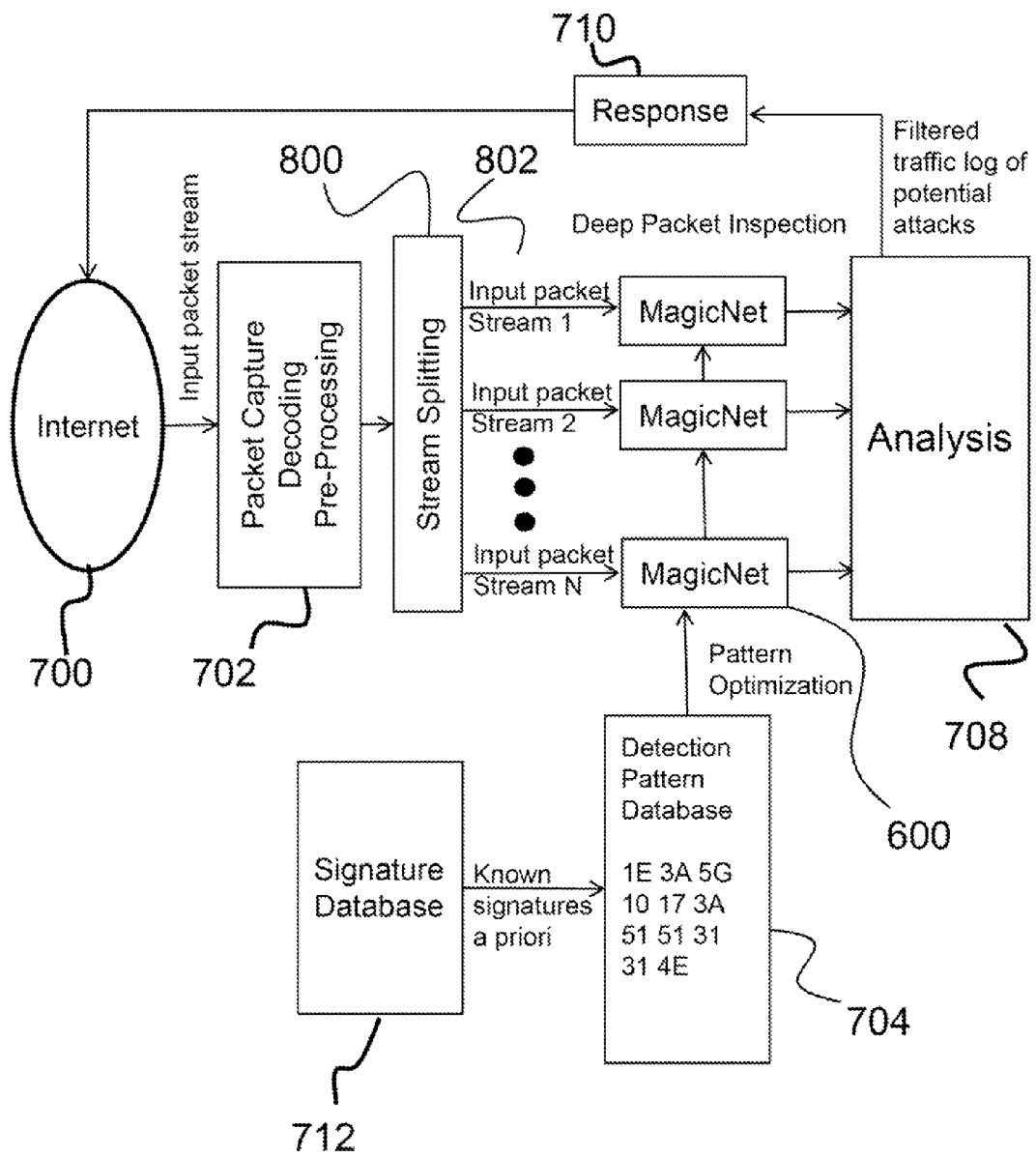
FIG. 8 is a block diagram, depicting an embodiment in which each MagicNet pattern matching module gets the full pattern database but only a portion of the stream.

Another embodiment according to the principles of the present invention is depicted in FIG. 8. To be contrasted with the embodiment depicted in FIG. 7, the system of FIG. 8 includes a stream splitting module 800 that splits the packet streams into parallel input packet streams 802. In this aspect, each MagicNet Pattern Matching Module 600 receives the full pattern database 704 data (based on, for example, the signature database 712) yet only a portion of the packet stream. For example and as shown, an input packet stream is received into the system from the internet 700. The pre-processing module 702 captures and decodes the packet to generate a string or stream of characters in a sequence or pattern, which is introduced to the stream splitting module 800. The analysis module 708 filters and provides a log of suspect packets (e.g., attacks) that can be used to provide an appropriate response 710.

Another embodiment according to the principles of the present invention s depicted in FIG. 9. The system as shown in FIG. 9 utilizes multiple MagicNet Pattern Matching Modules 600, each of which runs on parallel hardware (e.g., a graphics processing unit (GPU). The pattern database 704 (based on, for example, the signature database 712) in this embodiment splits the patterns across each MagicNet Pattern Matching Module 600, with each MagicNet Pattern Matching Module 600 receiving the entire input packet stream. For example and as shown, an input packet stream is received into the system from the internet 700. The pre-processing module 702 captures and decodes the packet to generate a string or stream of characters in a sequence or pattern, which is provided in parallel to a plurality of MagicNet Pattern Matching Modules 600. The analysis module 708 filters and provides a log of suspect packets (e.g., attacks) that can be used to provide an appropriate response 710.

Figure 10:
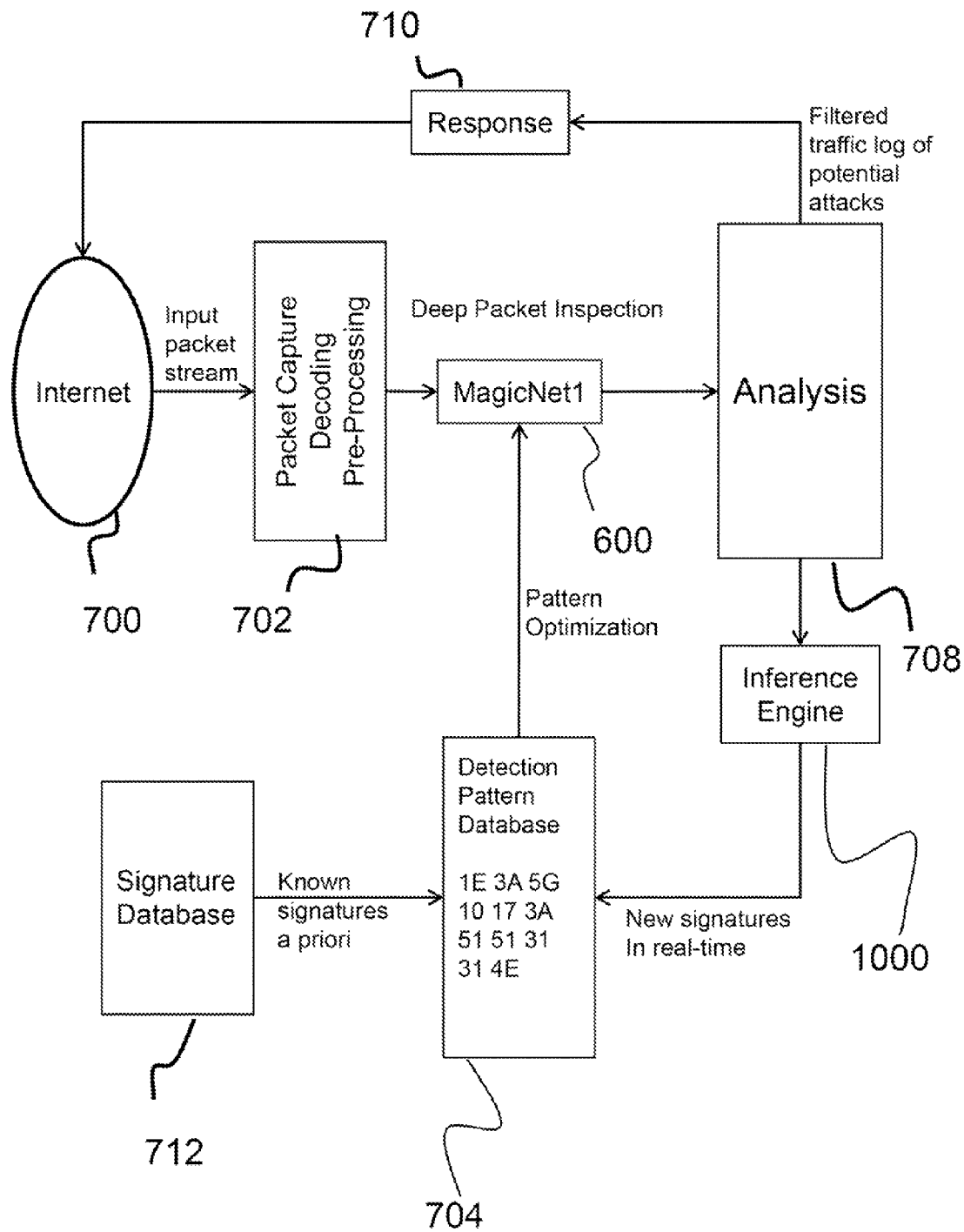
FIG. 10 is a block diagram, depicting an embodiment in which real-time attack signature updates are possible using the rapid capability for adding new patterns to the pattern database.

FIG. 10 illustrates another embodiment according to the principles of the present invention, depicting how real-time attack signatures updates are possible using the rapid capability for adding new patterns to the database 704. In this aspect, an inference engine 1000 is included. The inference engine 1000 can be an automated system or a human analyst that detects anomalous or new signatures using standard rule-based inferencing. A non-limiting example of an inference engine is eBayes TCP (Adaptive, Model-based Monitoring for Cyber Attack Detection. Keith Skinner & Alfonso Valdes. Lecture Notes in Computer Science, Number 1907, From Recent Advances in Intrusion Detection (RAID 2000). Edited by H. Debar and L. Me and F. Wu. Springer-Verlag, Toulouse, France. October, 2000. Pages 80-92.) For example and as shown, an input packet stream is received into the system from the internet 700. The pre-processing module 702 captures and decodes the packet to generate a string or stream of characters in a sequence or pattern, which is introduced to the MagicNet Pattern Matching Module 600. The analysis module 708 filters and provides a log of suspect packets (e.g., attacks) that can be used to provide an appropriate response 710. New signatures or packets are also provided to the inference engine 1000, which adds new patterns to the database 704 to add to or augment those as obtained from the signature database 712.

When an anomalous or new signature pattern is detected, the detection pattern database 704 is updated with the new signatures in real-time.

Each of the previous embodiments are described based on implementing digital hardware (e.g., CPU, GPU, FPGA). However, it should be understood that since the MagicNet Pattern Matching Module 600 uses integrate and fire spiking neurons with connection delays, it is possible to implement these in neuromorphic hardware that requires less power and is smaller in size and weight. Such nueromorphic hardware can be employed with chips that are optimized for low power use to model the brain. In addition, the conduction delays can be set to a range of values. In order to enable large numbers of connections per neuron, such a chip can be multiplexed in time. Assuming the chip uses a 2 GHz clock, a single chip containing 256 neurons and 25,600 connections (100 per neuron) would be capable of processing an input stream of characters at a minimum rate of 160 Mb/s since MagicNet requires only 1 clock cycle per input character (per neuron on the chip). With expected improvements in power usage, this chip would use power of <100 mW. Thus, through implementing neuromorphic hardware, one would expect that optimizations, such as use of physical connections instead of multiplexed connections and simpler integrate and fire neurons will enable a single chip to operate at 20 Gb/s with no increase in power usage.

What is claimed is:

1. A system for deep packet inspection and intrusion detection, comprising:
one or more processors and a memory, the memory having instructions encoded thereon such that upon execution of the instructions, the one or more processors cause a pattern matching module to perform operations of:
receiving as an input a data stream in a neural network, the data stream having a sequence of characters in a pattern, the data stream received in the neural network such that at each time t, only a single input character is received, with each single input character assigned to a neuron in the neural network;

activating the neuron assigned to the single character such that when active, the neuron fires to all connecting output neurons to form a neuron spike, each neuron spike from the assigned neuron to a connecting output neuron having a delay, determining a delay associated with each input character in the pattern, such that a position of each input character relative to an end of the pattern is stored in an alphabet-pattern-delay matrix (APDFM);

matching, with an activation matrix (AM), each input character with a stored pattern to generate a similarity match, such that if the similarity match exceeds a predetermined threshold, the sequence of characters in the input data stream is identified as the stored pattern; and wherein in matching with an activation matrix, the system performs matching by performing operations of:
assuming that a pattern to be matched is of length (n); and
adjusting a firing threshold to value (p), less or equal than (n), for an output neuron, thereby causing the output neuron to fire when any (p/n) of the input characters of the pattern are matched.

2. The system as set forth in claim 1, wherein the activation matrix is a matrix formed of columns and rows, with each column corresponding to a time step (t) and a single input character, with the rows corresponding to stored patterns against which the input characters are matched.

3. The system as set forth in claim 2, wherein when a current input character is matched in the activation matrix, the system determines if the current input character is present in the APDM and performs one of the following operations:

a. if the current input character is not present in the APDM, then a current column of the AM is cleared as the input character (x) is not present in any of the patterns;

b. if the current input character is present in the APDM, then:
   i. retrieving a list of patterns from the APDM that contain one or more occurrences of the current input character and the corresponding delays for the current input character within each pattern;
   ii. For each pattern ($p_i$) in the list, adding a one to cell number $((t+d_j) \bmod n)$ in the AM, where ($d_j$) is the $j^{th}$ delay associated with current input character in ($p_i$);
   iii. determining if any of the cells in column (t) of the AM have exceeded a predetermined threshold for the stored pattern associated with each row;
      1. if so, then designating the stored pattern corresponding to that row as a match; and c. clearing the current column of the AM, and repeating, operations (a) through (b) for a next input character.

4. The system as set forth in claim 3, wherein in matching with an activation matrix, wraparound occurs through periodic operation of the activation matrix, with a weight (w) being assigned to each output neuron when matching input characters, the weight (w) being a number of times a wraparound occurs.

5. The system as set forth in claim 4, wherein a frequency at which the operation of clearing the current column of the AM is reduced by providing increasingly higher weights (w) and corresponding thresholds when determining if any of the cells in column (t) of the AM have exceeded a predetermined threshold for the stored pattern associated with each row.

6. The system as set forth in claim 2, wherein in matching with an activation matrix, the system operates two activation matrices, a first activation matrix for pattern matching and a second activation matrix for clearing in parallel for future uses.

7. The system as set forth in claim 1, further comprising:
a pre-processing module, the pre-processing module receiving and decoding an input packet stream to generate a stream of input characters in a pattern, wherein a pattern matching module thereafter determines if the pattern in the stream of input characters is matched with any stored patterns, and
an analysis module for logging and filtering the input packet stream if it is determined that the pattern in the stream of input characters is a match with a stored pattern.

8. The system as set forth in claim 1, further comprising:
a pre-processing module, the pre-processing module receiving and decoding an input packet stream to generate a stream of input characters;
a stream splitting module, the stream splitting module splitting the stream of input characters into parallel streams of characters; and
a plurality of pattern matching modules, each pattern matching module receiving only a portion of the stream of characters and all known stored patterns to determine if a pattern in the portion of the stream of input characters is matched with any stored pattern.

9. The system as set forth in claim 1, further comprising:
a pre-processing module, the pre-processing module receiving and decoding an input packet stream to generate a stream of input characters in a pattern;
a stream splitting module, the stream splitting module splitting the stream of input characters into multiple complete streams of characters; and
a plurality of parallel pattern matching modules, each pattern matching module receiving a complete stream of characters and only a portion of stored patterns to determine if a pattern in the stream of input characters is matched with any stored pattern in the portion of stored patterns.

10. The system as set forth in claim 1, further comprising:
a pre-processing module, the pre-processing module receiving and decoding an input packet stream to generate a stream of input characters in a pattern, wherein a pattern matching module thereafter determines if the pattern in the stream of input characters is matched with any stored patterns;
an analysis module for logging and filtering the input packet stream if it is determined that the pattern in the stream of input characters is a match with a stored pattern; and
an inference engine for detecting, in real-time, new anomalous patterns and storing the new anomalous pattern with the stored patterns.

11. The system as set forth in claim 1, wherein in matching with an activation matrix, wraparound occurs through periodic operation of the activation matrix, with a weight (w) being assigned to each output neuron when matching input characters, the weight (w) being a number of times a wraparound occurs.

12. A computer program product for a deep packet inspection and intrusion detection system, the computer program product comprising computer-readable instructions stored on a non-transitory computer-readable medium that are executable by a computer having a processor for causing the processor to perform operations of:

receiving as an input a data stream in a neural network, the data stream having a sequence of characters in a pattern, the data stream received in the neural network such that at each time t, only a single input character is received, with each single input character assigned to a neuron in the neural network;

activating the neuron assigned to the single character such that when active, the neuron fires to all connecting output neurons to form a neuron spike, each neuron spike from the assigned neuron to a connecting output neuron having a delay, determining a delay associated with each input character in the pattern, such that a position of each input character relative to an end of the pattern is stored in an alphabet-pattern-delay matrix (APDFM);

matching, with an activation matrix (AM), each input character with a stored pattern to generate a similarity match, such that if the similarity match exceeds a predetermined threshold, the sequence of characters in the input data stream is identified as the stored pattern; and wherein in matching with an activation matrix, the system performs matching by performing operations of:

assuming that a pattern to be matched is of length (n); and adjusting a firing threshold to value (p), less or equal than (n), for an output neuron, thereby causing the output neuron to fire when any (p/n) of the input characters of the pattern are matched.

13. The computer program product as set forth in claim 12, wherein the activation matrix is a matrix formed of columns and rows, with each column corresponding to a time step (t) and a single input character, with the rows corresponding to stored patterns against which the input characters are matched.

14. The computer program product as set forth in claim 13, wherein when a current input character is matched in the activation matrix, the system determines if the current input character is present in the APDM and performs one of the following operations:

a. if the current input character is not present in the APDM, then a current column of the AM is cleared as the input character (x) is not present in any of the patterns;

b. if the current input character is present in the APDM, then:
i. retrieving a list of patterns from the APDM that contain one or more occurrences of the current input character and the corresponding delays for the current input character within each pattern;
ii. For each pattern ($p_i$) in the list, adding a one to cell number ((t+$d_j$)mod n) in the AM, where ($d_j$) is the $j^{th}$ delay associated with current input character in ($p_i$);
iii. determining if any of the cells in column (t) of the AM have exceeded a predetermined threshold for the stored pattern associated with each row;
1. if so, then designating the stored pattern corresponding to that row as a match; and c. clearing the current column of the AM, and repeating operations (a) through (b) for a next input character.

15. The computer program product as set forth in claim 14, wherein in matching with an activation matrix, wraparound occurs through periodic operation of the activation matrix, with a weight (w) being assigned to each output neuron when matching input characters, the weight (w) being a number of times a wraparound occurs.

16. The computer program product as set forth in claim 15, wherein a frequency at which the operation of clearing the current column of the AM is reduced by providing increasingly higher weights (w) and corresponding thresholds when determining if any of the cells in column (t) of the AM have exceeded a predetermined threshold for the stored pattern associated with each row.

17. The computer program product as set forth in claim 13, wherein in matching with an activation matrix, the system operates two activation matrices, a first activation matrix for pattern matching and a second activation matrix for clearing in parallel for future uses.

18. The computer program product as set forth in claim 12, further comprising:
a pre-processing module, the pre-processing module receiving and decoding an input packet stream to generate a stream of input characters in a pattern, wherein a pattern matching module thereafter determines if the pattern in the stream of input characters is matched with any stored patterns; and
an analysis module for logging and filtering the input packet stream if it is determined that the pattern in the stream of input characters is a match with a stored pattern.

19. The computer program product as set forth in claim 12, further comprising:
a pre-processing module, the pre-processing module receiving and decoding an input packet stream to generate a stream of input characters;
a stream splitting module, the stream splitting module splitting the stream of input characters into parallel streams of characters; and
a plurality of pattern matching modules, each pattern matching module receiving only a portion of the stream of characters and all known stored patterns to determine if a pattern in the portion of the stream of input characters is matched with any stored pattern.

20. The computer program product as set forth in claim 12, further comprising:
a pre-processing module, the pre-processing module receiving and decoding an input packet stream to generate a stream of input characters in a pattern;
a stream splitting module, the stream splitting module splitting the stream of input characters into multiple complete streams of characters; and
a plurality of parallel pattern matching modules, each pattern matching module receiving a complete stream of characters and only a portion of stored patterns to determine if a pattern in the stream of input characters is matched with any stored pattern in the portion of stored patterns.

21. The computer program product as set forth in claim 12, further comprising:
a pre-processing module, the pre-processing module receiving and decoding an input packet stream to generate a stream of input characters in a pattern, wherein a pattern matching module thereafter determines if the pattern in the stream of input characters is matched with any stored patterns;
an analysis module for logging and filtering the input packet stream if it is determined that the pattern in the stream of input characters is a match with a stored pattern; and
an inference engine for detecting, in real-time, new anomalous patterns and storing the new anomalous pattern with the stored patterns.

22. A computer implemented method for a deep packet inspection and intrusion detection system, the method comprising:

an act of causing a data processor to execute instructions stored on a non-transitory memory such that upon execution, the data processor performs operations of:

receiving as an input a data stream in a neural network, the data stream having a sequence of characters in a pattern, the data stream received in the neural network such that at each time t, only a single input character is received, with each single input character assigned to a neuron in the neural network;

activating the neuron assigned to the single character such that when active, the neuron fires to all connecting output neurons to form a neuron spike, each neuron spike from the assigned neuron to a connecting output neuron having a delay, determining a delay associated with each input character in the pattern, such that a position of each input character relative to an end of the pattern is stored in an alphabet-pattern-delay matrix (APDFM); and matching, with an activation matrix (AM), each input character with a stored pattern to generate a similarity match, such that if the similarity match exceeds a predetermined threshold, the sequence of characters in the input data stream is identified as the stored pattern; and wherein in matching with an activation matrix, the system performs matching by performing operations of:
assuming that a pattern to be matched is of length (n); and
adjusting a firing threshold to value (p), less or equal than (n), for an output neuron, thereby causing the output neuron to fire when any (p/n) of the input characters of the pattern are matched.

23. The method as set forth in claim 22, wherein the activation matrix is a matrix formed of columns and rows, with each column corresponding to a time step (t) and a single input character, with the rows corresponding to stored patterns against which the input characters are matched.

24. The method as set forth in claim 23, wherein when a current input character is matched in the activation matrix, the system determines if the current input character is present in the APDM and performs one of the following operations:

a. if the current input character is not present in the APDM, then a current column of the AM is cleared as the input character (x) is not present in any of the patterns;

b. if the current input character is present in the APDM, then:
  i. retrieving a list of patterns from the APDM that contain one or more occurrences of the current input character and the corresponding delays for the current input character within each pattern;
  ii. For each pattern ($p_i$) in the list, adding a one to cell number $((t+d_j) \mod n)$ in the AM, where ($d_j$) is the $j^{th}$ delay associated with current input character in ($p_i$);
  iii. determining if any of the cells in column (t) of the AM have exceeded a predetermined threshold for the stored pattern associated with each row;
    1. if so, then designating the stored pattern corresponding to that row as a match; and
c. clearing the current column of the AM, and repeating operations (a) through (b) for a next input character.

25. The method as set forth in claim 24, wherein in matching with an activation matrix, wraparound occurs through periodic operation of the activation matrix, with a weight (w) being assigned to each output neuron when matching input characters, the weight (w) being a number of times a wraparound occurs.

26. The method as set forth in claim 25, wherein a frequency at which the operation of clearing the current column of the AM is reduced by providing increasingly higher weights (w) and corresponding thresholds when determining if any of the cells in column (t) of the AM have exceeded a predetermined threshold for the stored pattern associated with each row.

27. The method as set forth in claim 23, wherein in matching with an activation matrix, the system operates two activation matrices, a first activation matrix for pattern matching and a second activation matrix for clearing in parallel for future uses.

28. The method as set forth in claim 22, further comprising acts of:
utilizing a pre-processing module, the pre-processing module receiving and decoding an input packet stream to generate a stream of input characters in a pattern, wherein a pattern matching module thereafter determines if the pattern in the stream of input characters is matched with any stored patterns; and
utilizing an analysis module for logging and filtering the input packet stream if it is determined that the pattern in the stream of input characters is a match with a stored pattern.

29. The method as set forth in claim 22, further comprising acts of:
utilizing a pre-processing module, the pre-processing module receiving and decoding an input packet stream to generate a stream of input characters;
utilizing a stream splitting module, the stream splitting module splitting the stream of input characters into parallel streams of characters; and
utilizing a plurality of pattern matching modules, each pattern matching module receiving only a portion of the stream of characters and all known stored patterns to determine if a pattern in the portion of the stream of input characters is matched with any stored pattern.

30. The method as set forth in claim 22, further comprising acts of:
utilizing a pre-processing module, the pre-processing module receiving and decoding an input packet stream to generate a stream of input characters in a pattern;
utilizing a stream splitting module, the stream splitting module splitting the stream of input characters into multiple complete streams of characters; and
utilizing a plurality of parallel pattern matching modules, each pattern matching module receiving a complete stream of characters and only a portion of stored patterns to determine if a pattern in the stream of input characters is matched with any stored pattern in the portion of stored patterns.

31. The method as set forth in claim 22, further comprising acts of:
utilizing a pre-processing module, the pre-processing module receiving and decoding an input packet stream to generate a stream of input characters in a pattern, wherein the pattern matching module thereafter determines if the pattern in the stream of input characters is matched with any stored patterns;
utilizing an analysis module for logging and filtering the input packet stream if it is determined that the pattern in the stream of input characters is a match with a stored pattern; and
utilizing an inference engine for detecting, in real-time, new anomalous patterns and storing the new anomalous pattern with the stored patterns.

* * * * *